(12) United States Patent
Huang

(10) Patent No.: US 9,740,274 B2
(45) Date of Patent: Aug. 22, 2017

(54) MOTHERBOARD SUPPLY CIRCUIT

(71) Applicant: HON HAI PRECISION INDUSTRY CO., LTD., New Taipei (TW)

(72) Inventor: Yang-Syuan Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 287 days.

(21) Appl. No.: 14/575,713

(22) Filed: Dec. 18, 2014

(65) Prior Publication Data

US 2016/0139652 A1 May 19, 2016

(30) Foreign Application Priority Data

Nov. 13, 2014 (TW) .............................. 103139454 A

(51) Int. Cl.
| G06F 1/00 | (2006.01) |
| G06F 1/26 | (2006.01) |
| G06F 1/32 | (2006.01) |
| H02J 7/00 | (2006.01) |
| H02J 1/00 | (2006.01) |
| G06F 13/40 | (2006.01) |
| H02J 7/04 | (2006.01) |
| G06F 1/18 | (2006.01) |
| G06F 9/44 | (2006.01) |

(52) U.S. Cl.
CPC ............ *G06F 1/3287* (2013.01); *G06F 1/263* (2013.01); *G06F 13/4077* (2013.01); *G06F 1/189* (2013.01); *G06F 1/32* (2013.01); *G06F 9/4418* (2013.01); *H02J 7/0052* (2013.01); *H02J 7/042* (2013.01); *Y02B 60/1228* (2013.01); *Y02B 60/1235* (2013.01)

(58) Field of Classification Search
CPC ...... G06F 1/3287; G06F 9/4418; G06F 1/189; G06F 1/32; G06F 1/263; G06F 13/4077; H02J 7/0052; H02J 7/042
USPC .......... 713/323, 300, 324; 320/137; 323/318
See application file for complete search history.

(56) References Cited

U.S. PATENT DOCUMENTS

| 6,098,175 A * | 8/2000 | Lee ............................ G06F 1/26 307/80 |
| 6,538,344 B1 * | 3/2003 | Yang ........................ H02J 9/061 307/125 |
| 2005/0246557 A1 * | 11/2005 | Vanzante ................ G06F 1/266 713/300 |
| 2010/0125743 A1 * | 5/2010 | Yeh ........................ G06F 1/3203 713/320 |

(Continued)

*Primary Examiner* — Ji H Bae
(74) *Attorney, Agent, or Firm* — Steven Reiss

(57) ABSTRACT

A motherboard supply circuit includes a motherboard and a control circuit coupled to the motherboard. The motherboard is configured to couple to a power supply. The power supply is configured to supply power to a notebook computer and charge a battery. The power supply is also configured to supply power to the motherboard via the control circuit. The motherboard is configured to switch off the control circuit when detecting the notebook computer is in stand-by, thereby enabling the power supply not to supply power to the motherboard. The motherboard is also configured to switch on the control circuit upon detecting that the battery needs to be charged, thereby stopping the power supply from supplying power to the motherboard.

20 Claims, 2 Drawing Sheets

(56) References Cited

U.S. PATENT DOCUMENTS

| | | | |
|---|---|---|---|
| 2011/0018854 A1* | 1/2011 | Barclay | G06F 1/3203 345/211 |
| 2011/0271131 A1* | 11/2011 | Lefebvre | G06F 1/26 713/323 |
| 2012/0023339 A1* | 1/2012 | Chueh | G06F 1/263 713/300 |
| 2013/0318368 A1* | 11/2013 | Cong | G06F 1/263 713/300 |
| 2014/0164796 A1* | 6/2014 | Rangarajan | G06F 1/30 713/300 |
| 2014/0317426 A1* | 10/2014 | Zhou | G06F 1/32 713/320 |
| 2015/0286274 A1* | 10/2015 | Shih | G06F 1/3206 713/323 |

\* cited by examiner

MOTHERBOARD SUPPLY CIRCUIT

CROSS-REFERENCE TO RELATED APPLICATIONS

This application claims priority to Taiwanese Patent Application No. 103139454 Nov. 13, 2014, the contents of which are incorporated by reference herein.

FIELD

The subject matter herein generally relates to a power supply circuit.

BACKGROUND

A motherboard supply circuit may be used to supply power to a motherboard.

BRIEF DESCRIPTION OF THE DRAWINGS

Implementations of the present technology will now be described, by way of example only, with reference to the attached figures.

DETAILED DESCRIPTION

Figure 1:
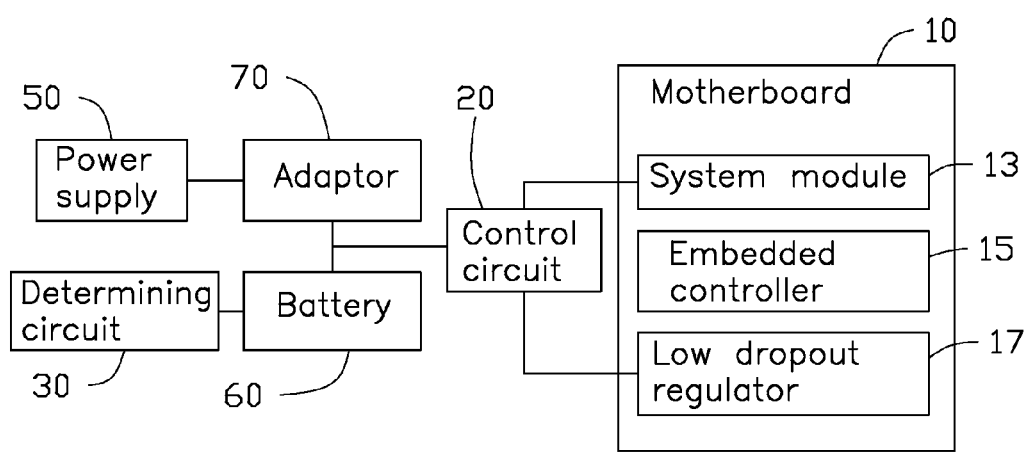
FIG. 1 is a block diagram of one embodiment of a motherboard supply circuit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

The present technology is described in relation to a supply circuit configured to supply power to a motherboard.

FIG. 1 illustrates one embodiment of a motherboard supply circuit. The motherboard supply circuit comprises a motherboard 10, a control circuit 20, and a determining circuit 30. The motherboard 10 is configured to couple to a power supply 50 via an adaptor 70. The power supply 50 is configured to supply power to a notebook computer and charge a battery 60. The battery 60 is configured to supply power to the notebook computer when the power supply 50 is not capable of supplying power to the notebook computer.

The motherboard 10 comprises a system module 13, an embedded controller (EC) 15, and a low dropout regulator 17. The system module 13 is configured to detect working status of the notebook computer and determine whether the notebook computer is in stand-by. In at least one embodiment, stand-by comprises an S3 status (Suspend to RAM), an S4 status (Suspend to Disk), and an S5 status (Turn off). The system module 13 is configured to switch off the control circuit 20 after detecting the notebook computer is in stand-by, thereby enabling the power supply 50 not to supply power to the embedded controller 15. The system module 13 is also configured to send a switching signal to the control circuit 20 to switch on the control circuit 20 after detecting the notebook computer is switched on, thereby enabling the power supply 50 to supply power to the embedded controller 15.

Figure 2:
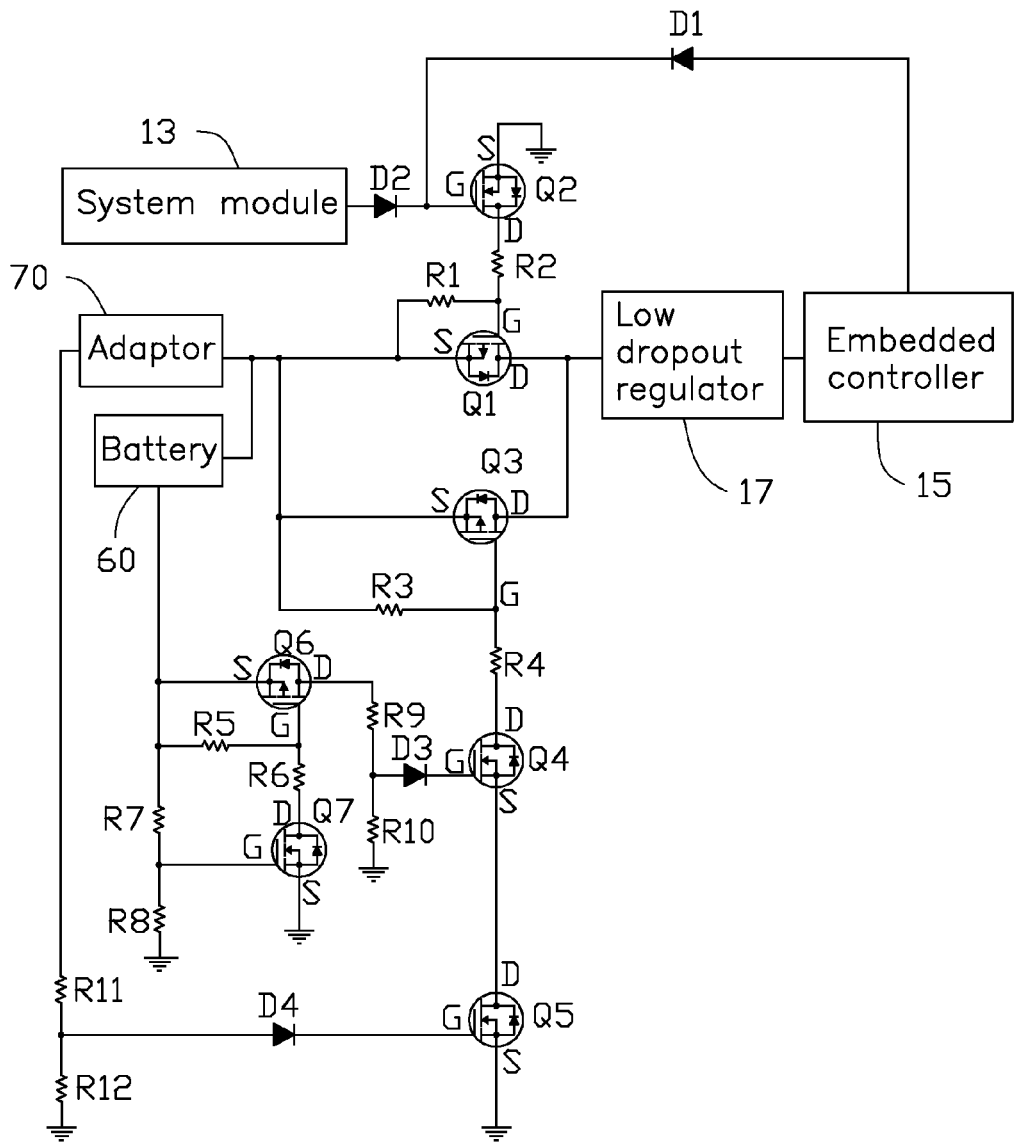
FIG. 2 is a circuit diagram of one embodiment of the motherboard supply circuit of FIG. 1.

FIG. 2 illustrates that the control circuit 20 comprises a plurality of field effect transistors (FET), a plurality of diodes, and a plurality of resistors. The plurality of the field effect transistors of the control circuit 20 comprises a first FET Q1, a second FET Q2, a third FET Q3, a fourth FET Q4, and a fifth FET Q5. The plurality of diodes of the control circuit 20 comprises a first diode D1, a second diode D2, and a third diode D4.

The determining circuit 30 comprises a plurality of field effect transistors (FET) and a plurality of resistors. The plurality of transistors of the determining circuit 30 comprises a sixth FET Q6 and a seventh FET Q7.

In at least one embodiment, each FET is a Metal-Oxide-Semiconductor FET (MOSFET). Each of the first FET Q1, the second FET Q2, the fourth FET Q4, the fifth FET Q5, and the sixth FET Q6 is an N-channel MOSFET. Each of the third FET Q3 and the seventh FET Q7 is a P-channel MOSFET.

The power supply 50 is coupled to the adaptor 70. The battery 60 is coupled to the adaptor 70 and a source terminal S of the first FET Q1. A drain terminal D of the first FET Q1 is coupled to the low dropout regulator 17. A first resistor R1 is coupled to a source terminal S of the first FET Q1 and a gate terminal G of the first FET Q1. A second resistor R2 is coupled to the gate terminal G of the first FET Q1 and a drain terminal D of the second FET Q2. A source terminal S of the second FET Q2 is grounded. A gate terminal G of the second FET Q2 is coupled to a cathode of the first diode D1 and a cathode of the second diode D2. An anode of the first diode D1 is coupled to the embedded controller 15. An anode of the second diode D2 is coupled to the system module 13. A drain terminal D of the third FET Q3 is coupled to the low dropout regulator 17. A source terminal S of the third FET Q3 is coupled to the adaptor 70. A third resistor R3 is coupled between a gate terminal G of the third FET Q3 and the source terminal S of the third FET Q3. A fourth resistor R4 is coupled between the gate terminal G of the third FET Q3 and a drain terminal S of the fourth FET Q4. A gate terminal G of the fourth FET Q4 is coupled to a cathode of the third diode D3. A source terminal S of the fourth FET Q4 is coupled to a drain terminal D of the fifth FET Q5. A source terminal S of the fourth FET Q4 is grounded. A gate terminal G of the fifth FET Q5 is coupled to a cathode of the fourth diode D4.

The battery 60 is coupled to a source terminal S of the sixth FET Q6. The source terminal S of the sixth FET Q6 is coupled to a gate terminal G of the seventh FET Q7 via a fifth resistor R5. A gate terminal G of the sixth FET Q6 is coupled to a drain terminal D of the seventh FET Q7 via a sixth resistor R6. The gate terminal G of the seventh FET Q7 is coupled to the source terminal S of the sixth FET Q6 via a seventh resistor R7. The gate terminal G of the seventh FET Q7 is grounded via an eighth resistor R8. A source terminal S of the seventh FET Q7 is grounded. A drain terminal of the sixth FET Q6 is coupled to one end of a ninth resistor R9. The other end of the ninth resistor R9 is grounded via a tenth resistor R10. The other end of the ninth resistor R9 is coupled to an anode of the third diode D3. An anode of the fourth diode D4 is coupled to the adaptor 70 via an eleventh resistor R11. The anode of the fourth diode D4 is grounded via a twelfth resistor R12.

A working principle of the motherboard supply circuit is as follows. The first FET Q1 and the third FET Q3 are switched off when the system module 13 detects the notebook computer is in stand-by. The control circuit 20 switches off the embedded controller 15 and the power supply 50, thereby disabling the power supply 50 from supplying power to the embedded controller 15. The system module 13 sends a switching signal to the second FET Q2 via the second diode D2 when a power switch (not shown) of the notebook computer is switched on. The first FET Q1 and the second FET Q2 are switched on, thereby enabling the power supply 50 to supply power to the embedded controller 15 via the adaptor 70 and the low dropout regulator 17. The embedded controller 15 sends a booting signal to the first FET Q1 via the first diode D1. The notebook computer is booted. The sixth FET Q6 and the seventh FET Q7 are switched on when an electronic quantity of the battery 60 is less than a reference value. The determining circuit 30 outputs a charging request signal to the fourth FET Q4. The system module 30 determines whether the power supply 50 is connected to the notebook computer via the adaptor 70 after receiving the charging request signal. The system module 30 sends a charging allowed signal to the fifth FET Q5 via the fourth diode D4 after the power supply 50 is connected to the notebook computer via the adaptor 70. The fifth FET Q5 is switched on. The third FET Q3 is switched on. The low dropout regulator 17 is switched on, thereby enabling the power supply 50 to supply power to the embedded controller 15. The embedded controller 15 sends a charging signal to the first FET Q1 via the first diode D1. The battery 60 is charged.

In the motherboard supply circuit, the embedded controller 15 is coupled to the power supply 50 via the control circuit 20 when the notebook computer is not in stand-by, thereby enabling the power supply 50 to supply power to the embedded controller 15. The embedded controller 15 is disconnected from the power supply 50 via the control circuit 20 when the notebook computer is in stand-by, thereby disabling the power supply 50 from supplying power to the embedded controller 15, thus decreasing the stand-by power consumption.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure to the full extent indicated by the broad general meaning of the terms in which the appended claims are expressed.

What is claimed is:

1. A motherboard supply circuit comprising:
   a motherboard configured to couple to a power supply; and
   a control circuit coupled to the motherboard and comprising a first field effect transistor (FET) and a second FET;
   wherein, the power supply is configured to supply power to a notebook computer, charge a battery, and supply power to the motherboard via the control circuit;
   wherein, the motherboard is configured to switch off the first FET and the second FET when detecting the notebook computer is in stand-by status, thereby stopping the power supply from supplying power to the motherboard; and
   wherein, the motherboard is also configured to switch on the second FET after detecting the battery needs to be charged, the first FET is switched on after the second FET is switched on, thereby enabling the power supply to supply power to the motherboard.

2. The motherboard supply circuit of claim 1, wherein the first FET is coupled to the power supply and the motherboard, the second FET is coupled to the first FET and the motherboard.

3. The motherboard supply circuit of claim 2, wherein the control circuit further comprises a third FET, the third FET is coupled to the power supply and the motherboard, and the motherboard is configured to switch off the first FET and the third FET after detecting the notebook computer is the stand-by status.

4. The motherboard supply circuit of claim 3, further comprising a determining circuit, wherein the determining circuit is configured to switch on the third FET after determining the battery needs to be charged, and the power supply supplies power to the motherboard after the third FET is switched on.

5. The motherboard supply circuit of claim 4, wherein the control circuit further comprises a fourth FET, the fourth FET is coupled to the third FET and the motherboard, the determining circuit comprises a fifth FET coupled to the fourth FET, the determining circuit is configured to switch on the fifth FET after determining the battery needs to be charged, the fourth FET is switched on after the fifth FET is switched on, and the third FET is switched on after the fourth FET is switched on.

6. The motherboard supply circuit of claim 5, wherein the determining circuit further comprises a sixth FET coupled to the fifth FET, the determining circuit is configured to switch on the sixth FET after determining an electronic quantity of the battery is less than a reference value, the fifth FET is switched on after the sixth FET is switched on, the fourth FET is switched on after the fifth FET is switched on, the third FET is switched on after the fourth FET is switched on, and the power supply charge to the battery after the third FET is switched on.

7. The motherboard supply circuit of claim 1, wherein the motherboard comprises a system module and an embedded controller, the system module is configured to switch off the embedded controller after detecting the notebook computer is the stand-by status, thereby enabling the power supply not to supply power to the embedded controller.

8. The motherboard supply circuit of claim 7, wherein the motherboard further comprises a low dropout regulator coupled to the control circuit and the embedded controller, the motherboard is also configured to switch on the control circuit after detecting the battery needs to be charged, thereby enabling the power supply to supply power to the motherboard via the low dropout regulator.

9. The motherboard supply circuit of claim 8, further comprising a determining circuit, wherein the determining circuit is configured to send a charging request signal to the system module via the control circuit after determining the battery needs to be charged, the system module is configured to send a charging allowed signal to the power supply after receiving the charging request signal, and the power supply is configured to charge the battery and supply power to the embedded controller after receiving the charging allowed signal.

10. The motherboard supply circuit of claim 1, wherein the motherboard is also configured to switch on the control circuit after detecting a power switch of the notebook computer is switched on, thereby enabling the power supply to supply power to the motherboard.

11. A motherboard supply circuit comprising:
a motherboard configured to couple to a power supply; and
a control circuit coupled to the motherboard and comprising a first field effect transistor (FET) and a second FET;
wherein, the power supply is configured to supply power to a notebook computer, charge a battery, and supply power to the motherboard via the control circuit;
wherein, the motherboard is configured to switch off the first FET when detecting the notebook computer is in stand-by status, thereby stopping the power from supplying power to the motherboard;
wherein, the motherboard is also configured to switch on the second FET after detecting the battery needs to be charged, the first FET is switched on after the second FET is switched on; and
wherein, the power supply is configured to supply power to the motherboard after the first FET is switched on.

12. The motherboard supply circuit of claim 11, wherein the first FET is coupled to the power supply and the motherboard, the second FET is coupled to the first FET and the motherboard.

13. The motherboard supply circuit of claim 12, wherein the control circuit further comprises a third FET, the third FET is coupled to the power supply and the motherboard, and the motherboard is configured to switch off the first FET and the third FET after detecting the notebook computer is in the stand-by status.

14. The motherboard supply circuit of claim 13, further comprising a determining circuit, wherein the determining circuit is configured to switch on the third FET after determining the battery needs to be charged, and the power supply supplies power to the motherboard after the third FET is switched on.

15. The motherboard supply circuit of claim 14, wherein the control circuit further comprises a fourth FET, the fourth FET is coupled to the third FET and the motherboard, the determining circuit comprises a fifth FET coupled to the fourth FET, the determining circuit is configured to switch on the fifth FET after determining the battery needs to be charged, the fourth FET is switched on after the fifth FET is switched on, and the third FET is switched on after the fourth FET is switched on.

16. The motherboard supply circuit of claim 15, wherein the determining circuit further comprises a sixth FET coupled to the fifth FET, the determining circuit is configured to switch on the sixth FET after determining an electronic quantity of the battery is less than a reference value, the fifth FET is switched on after the sixth FET is switched on, the fourth FET is switched on after the fifth FET is switched on, the third FET is switched on after the fourth FET is switched on, and the power supply charge to the battery after the third FET is switched on.

17. The motherboard supply circuit of claim 11, wherein the motherboard comprises a system module and an embedded controller, the system module is configured to switch off the embedded controller after detecting the notebook computer is the stand-by status, thereby stopping the power supply from supplying power to the embedded controller.

18. The motherboard supply circuit of claim 17, wherein the motherboard further comprises a low dropout regulator coupled to the control circuit and the embedded controller, the motherboard is also configured to switch on the control circuit after detecting the battery needs to be charged, thereby enabling the power supply to supply power to the motherboard via the low dropout regulator.

19. The motherboard supply circuit of claim 18, further comprising a determining circuit, wherein the determining circuit is configured to send a charging request signal to the system module via the control circuit after determining the battery needs to be charged, the system module is configured to send a charging allowed signal to the power supply after receiving the charging request signal, and the power supply is configured to charge the battery and supply power to the embedded controller after receiving the charging allowed signal.

20. The motherboard supply circuit of claim 11, wherein the first FET is an N-channel MOSFET.

* * * * *